US005487523A

United States Patent [19]

Ingram et al.

[11] Patent Number: 5,487,523

[45] Date of Patent: Jan. 30, 1996

[54] READILY RELOCATABLE SECURITY MOUNT WHICH CAN HOLD ARTICLES WITH A WIDE RANGE OF DIMENSIONS

[75] Inventors: William D. Ingram, Irvine, Calif.; J. Steven James, Philomath, Oreg.

[73] Assignee: Ivie Industries, Irvine, Calif.

[21] Appl. No.: 109,725

[22] Filed: Aug. 20, 1993

[51] Int. Cl.[6] .......... F16M 13/00

[52] U.S. Cl. .......... 248/551; 248/553; 248/680; 248/205.3; 248/500

[58] Field of Search .......... 248/551, 552, 248/553, 558, 205.3, 346, 500, 680, 681, 918; 70/58

[56] References Cited

U.S. PATENT DOCUMENTS

| | | | |
|---|---|---|---|
| 4,022,036 | 5/1977 | Cebular | 248/553 X |
| 4,579,311 | 4/1986 | Spranza, III | 248/553 |
| 4,585,202 | 4/1986 | Parsekian | 248/553 |
| 4,696,449 | 9/1987 | Woo et al. | 248/553 |
| 4,712,763 | 12/1987 | Leite | 248/553 |
| 4,739,637 | 4/1988 | Finkel et al. | 248/553 X |
| 5,076,079 | 12/1991 | Monoson et al. | 248/553 X |
| 5,082,233 | 1/1992 | Ayers et al. | 248/553 X |
| 5,085,395 | 2/1992 | Frater et al. | 70/58 X |
| 5,135,197 | 8/1992 | Kelley et al. | 248/551 |
| 5,169,114 | 12/1992 | O'Neill | 248/551 |
| 5,335,892 | 8/1994 | Busch | 248/551 |

*Primary Examiner*—Ramon O. Ramirez
*Assistant Examiner*—Derek J. Berger
*Attorney, Agent, or Firm*—Donald D. Mon

[57] ABSTRACT

A security mount for releasably holding a separate protected article to a surface. A flexible mat with a plurality of openings has an adhesive face for attachment to the surface. A flexible metal sheet surrounds each of the openings, with an internally threaded post extending through the opening. A headed bolt is threaded into at least some of the posts to hold the article to it, and can also be used to release the mat from the surface. The mount may also include brackets and a lock to hold an article to a base plate, when the base plate is the article that is held to the base plate.

5 Claims, 3 Drawing Sheets

READILY RELOCATABLE SECURITY MOUNT WHICH CAN HOLD ARTICLES WITH A WIDE RANGE OF DIMENSIONS

FIELD OF THE INVENTION

A mount adhesively attachable to a surface, which mount can hold articles with a wide range of dimensions.

BACKGROUND OF THE INVENTION

The use of adhesive pads as part of a security mount to hold protected articles to a surface such as a desk is a well-developed art. Gassaway U.S. Pat. Nos. 3,850,392 and 4,634,009 are examples of such art.

Further developments in this field have related to means by which the mount holds a protected article to itself. In the early years of this art, there were only a few basic shapes and sizes of articles on the market which justified the cost of a security mount, and it was economical to manufacture mounts for use with specific products. However, any uniformity of dimensions of structures between goods of various manufacturers, and even between various products of the same manufacturer, is a thing of the past.

Also, as the computer art has progressed, the prices of comparable goods have steadily fallen. The same security mount which would have been demanded for a $25,000.00 computer may be a questionable cost to protect a $2,000.00 computer. In view of the likelihood that a given computer may be outdated in a relatively short time, manufacturing or purchasing a costly security mount that is useful for only one product becomes a one-shot expense which is often difficult to justify.

When computers were first brought into open offices and schools, their high cost and uniqueness justified, at least to purchasing agents, security mounts which had but one application, and which were extremely difficult to remove. Marring of desk and table surfaces by drilling holes through them was even tolerated. The Gassaway concept of an adhesive pad eliminated that nuisance, and remains a preferred technique. It has become even more attractive with the development of a means to remove the pad from the surface after a permitted release of the article from the mount.

The earlier mounts were installed by a technician. The expenses of a technician became part of the cost of the article, and was recognized as such.

Before the new technique for removing the pad was developed, the pad could only be released by the use of heat. Again a technician would show up with a heat gun in his hand and proceed to heat the pad until it could be peeled off. This often left a residue on the desk or table, and if it did not char or otherwise mar the surface, it at least worried the owner. Then the mount itself had to be reconditioned. That often meant the removal of the pad from an intermediate metal plate. This became another cost, and sometimes a new intermediate plate was required. After that, the technician would re-install the mount.

Accordingly, this type of security mount soon became regarded as a permanent installation often dedicated to a single product model, and its disadvantages were accepted. However, with the proliferation of new products with different sizes and shapes, and the frequent need to set up the article in a new location, permanence, or near permanence became worse than a nuisance. The situation calls not only for a mount which can accommodate a wide range of articles, but one which can be moved without calling on the services of a technician, and without substantial reconditioning expense.

The situation has become further impacted by considerations of varying levels of security. Total security can be obtained without the use of security mounts by an absolute control over access to the area where the protected article is used. Such installations exist, and are not a significant market for hold-down devices for the reason that they are not needed. Instead, the problem is in dispersed and more open locations, where they often are loosely supervised by day, and are usually unsupervised at night, except by local police and security patrols.

This circumstance raises the issue of affordable, or even attainable, levels of security. Unless the value of the article is so great as to justify full-time area security (in which it is likely to be so bulky as hardly to be transportable by a thief), security is required only as against casual theft, or theft which can be done so quickly as to evade the more routine protections such as police patrols and intrusion alarms.

Casual theft can readily be attended to merely by making the act of removal an obvious thing. This is enough to deter the casual thief. The more professional thief will generally be deterred by a system which gives him less than five minutes to enter the area, detach the article, and get away. If a thief can be assured of more than five minutes, he can remove the article at what is to him leisure, and can use a strong tool system to do it, destroying whatever holds the article to its support.

In view of the rapid developments in this field, there is a need for a security mount which has the following features:

1. It is adhesively mountable to a support by a pad which itself is releasable, without leaving a residue, and is readily replaced by a new pad which is modestly priced.
2. It should be installed, removed, refitted with a new pad and re-installed all without requiring a technician's services, thereby reducing the cost of the mount as installed.
3. Its pad is provided with joinder means that can releasably receive a rigid base. This base is releasable only when there is no protected article in place.
4. Its base must provide retention means to retain a protected article against vertical removal, against horizontal removal, and against any combination of them.
5. Its retention means must be adjustable so as to embrace at least two corners and one opposite edge of an article, and to be fixed in an adjusted position respective to the article being protected, so as to be receptive to articles within a wide range of shapes and dimensions.
6. Its retention means must be able to release the article at the edge so as to enable the removal of the article from the mount by a key-lock arrangement.
7. Adjustability of the means for vertical restraint must be resistant to removal or release. For adjustment in the horizontal plane, it must be shielded from unauthorized access.

This invention provides all of the foregoing advantages.

BRIEF DESCRIPTION OF THE INVENTION

A security mount according to this invention includes a base plate, an adhesive mat to be adhered to a surface such as a desk or a table, a plurality of means to release the mat from said surface, said base plate being releasably connected to said means, retention brackets for two top rear corners of an article to be protected and for an opposite to front top edge of said article, and releasable lock means to hold the bracket respective to the front top edge.

According to this invention, the rear brackets are vertically and angularly adjustable, and the front bracket is horizontally and vertically adjustable.

DETAILED DESCRIPTION OF THE INVENTION

Figure 1:
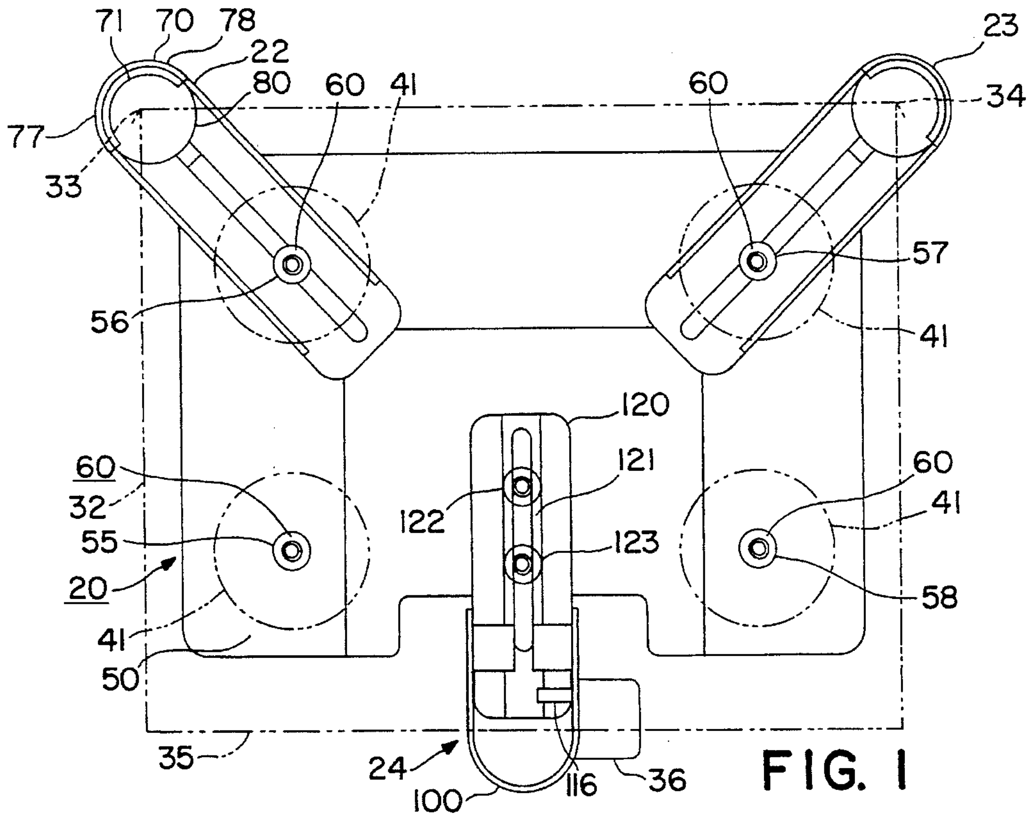
FIG. 1 is a plan view of the mount with an article (shown in phantom line) held therein.
Figure 2:
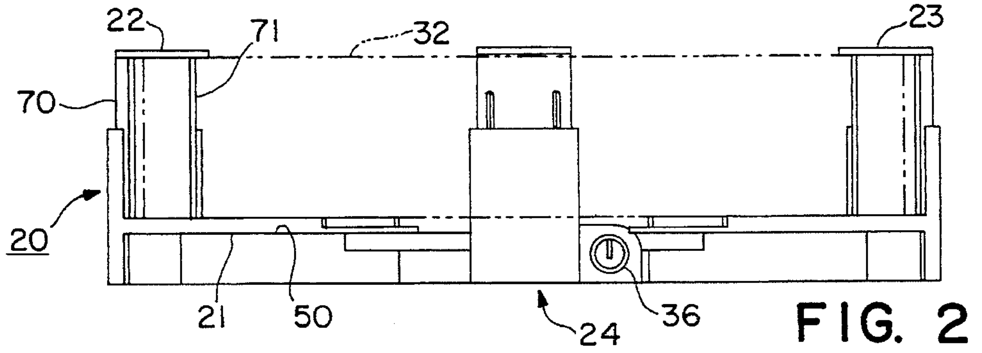
FIG. 2 is a front view of FIG. 1.
Figure 3:
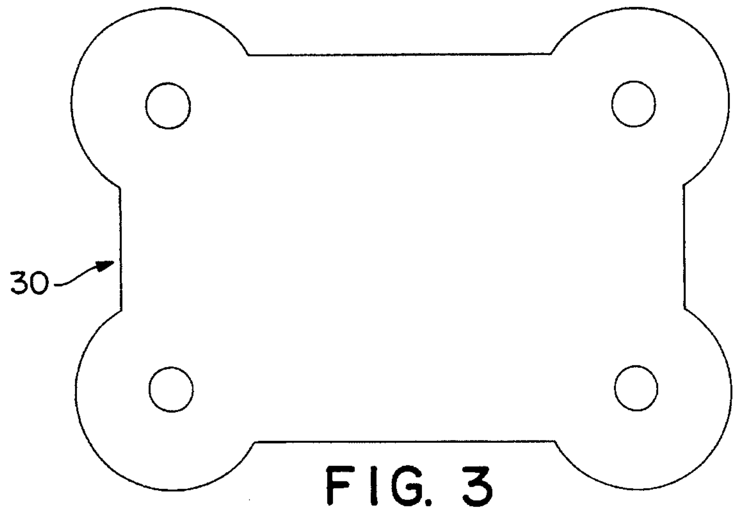
FIG. 3 is a plan view of a mat used in this invention.

The presently-preferred embodiment of a mount 20 according to the invention is shown in FIG. 1. It includes a rigid metal base plate 21, rear brackets 22 and 23, and a front bracket and lock assembly 24. These elements will be described in detail below.

Figure 4:
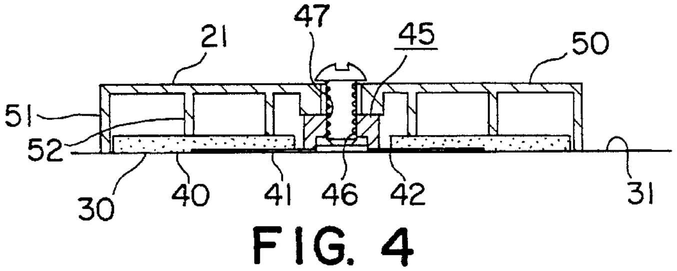
FIG. 4 shows the base plate of the invention held to the mat.

Beneath the base plate is an adhesive mat 30 (FIG. 4). It is the function of this mat to hold the base plate to a surface 31. It is the function of the base plate to hold a protected article 32 to itself.

The base plate will usually be made with a rectangular configuration. The brackets are adjustable to accommodate a range of article shapes and sizes. An article 32 to be protected is shown in phantom line for convenience in disclosure. Two of its rear upper corners 33, 34 are engaged and overhung by the rear brackets. An opposite front top edge 35 is engaged and overhung by the front bracket. The front bracket is provided with a lock 36 which prevents the bracket from being moved away from the base unless it is unlocked. This combination of adjusted fixed rear brackets and a lockable adjusted fixed front bracket prevent horizontal movement of the article relative to the base. As will later be shown, the overhangs on the brackets prevent vertical movement of the article relative to the base. Accordingly, the adjustable brackets reliably hold the article to the base unless the front bracket is unlocked and slid away from the article. It should be observed that there need be no foot on the article to be engaged to the mount. The article is free from any attachment to the mount. Instead it is retained by the brackets at the two rear corners and at the front edge. With the foregoing in mind, the details of these elements will now be described.

Adhesive mat 30 is a flexible body of substantial thickness. It is fully described in Gassaway patent No. 3,850,392, which is incorporated herein by reference for its detailed description of this element. However, it has only one adhesive face, and generally is made of a tough foam.

At this point it is sufficient to observe that the mat has a suitable bonding strength to a surface, and also will permit itself to be peeled as the consequence of a pronounced upward flexure. It should not "pop" off of the surfaces as a flat body, but high localized separation forces will result in a peeling action. The mat is not rigid, but rather is flexible without appreciable elasticity, to allow for a permitted peeling action yet to be described.

The mat has an adhesive layer 40, on its lower surface to form its adhesive face, which serves to bond the mount to a surface. It is at the adhesive layer that the mat will be peeled off. The base plate does not bond to the mat.

Figure 6:
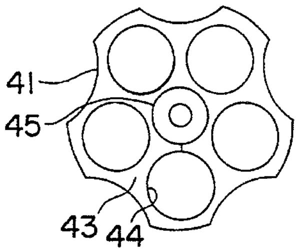
FIG. 6 is a plan view of means for removing the mat from a surface.
Figure 7:
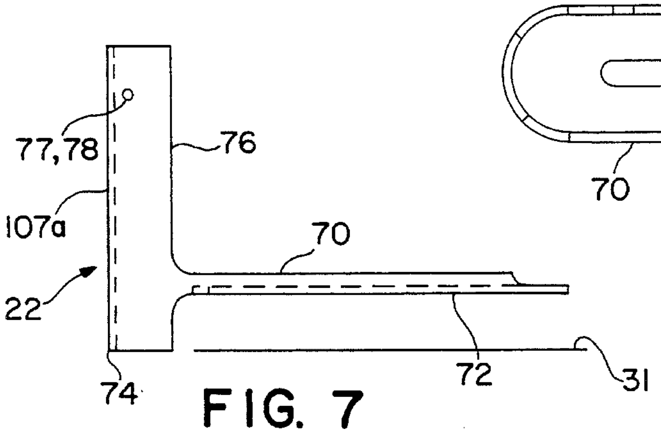
FIG. 7 is a side view of a rear bracket.
Figure 8:
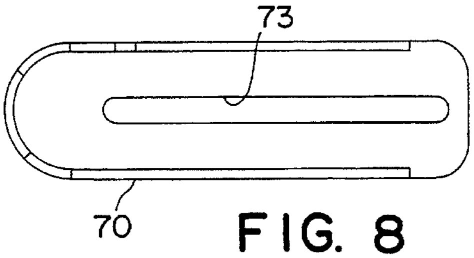
FIG. 8 is a top view of FIG. 7.
Figure 9:
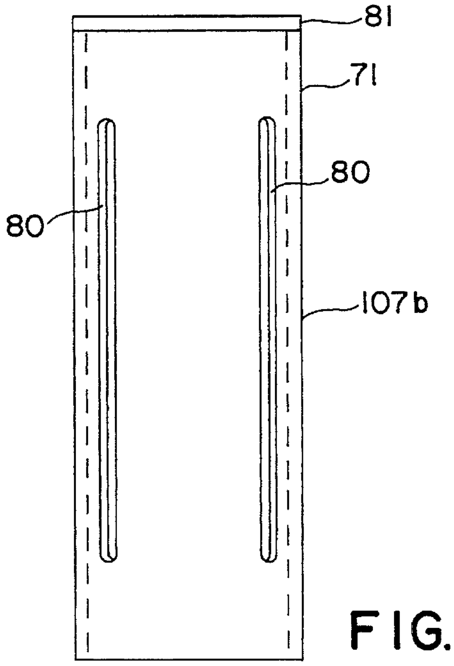
FIG. 9 is a left hand view of a part of the rear brackets.
Figure 10:
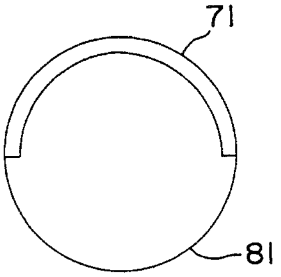
FIG. 10 is a bottom view of FIG. 9.
Figure 12:
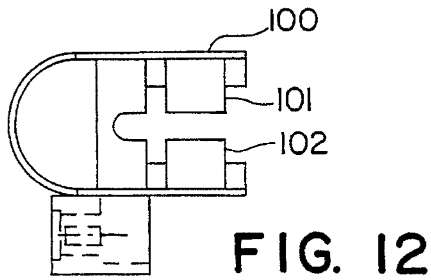
FIG. 12 is a top view of FIG. 11.
Figure 11:
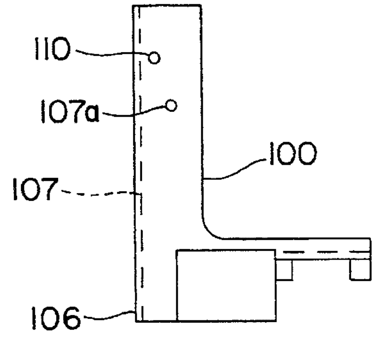
FIG. 11 is a side view of a guide for the front bracket.
Figure 13:
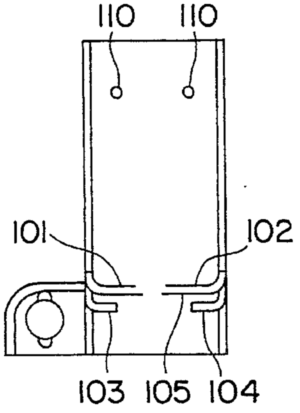
FIG. 13 is a right hand view of FIG. 11.
Figure 14:
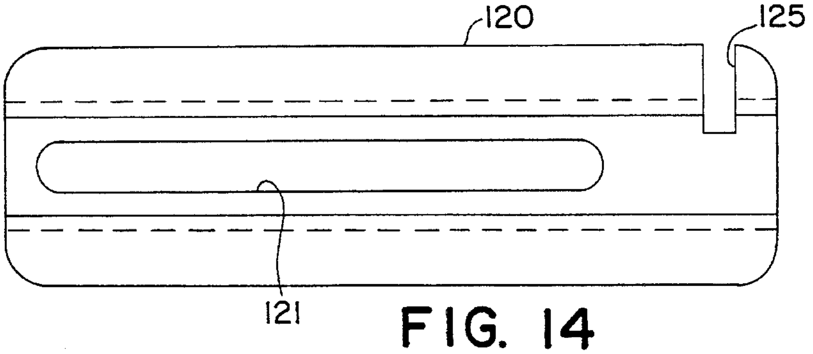
FIG. 14 is a plan view of a slide to engage the guide.

Means for peeling the adhesive mat from a surface are included in the mat. A thin metal sheet 41 is placed around a hole 42 through the mat. Such a sheet is shown in detail in FIG. 6. It has a web 43 with a plurality of openings 44 which permit the adhesive mat to press through and bond to the base around hole 42 where it is not covered by the sheet, and also over the remainder of the mat. A post 45 is welded to sheet 41. It has a central mounting passage 46 with an internal thread 47. This thread is part of the means to hold the base plate to the mat. The joinder of the post to the sheet is of fundamental importance to the integrity of the mount.

There are four of these sheets and posts, one near each corner of the mat. Because they are identical, only one will be described in detail. Means for removal of the mat will be described later.

Base plate 21 has an upper plate 50 on which the article will rest. A peripheral skirt 51 extends around it, and extends downwardly to cover the edges of the mat, thereby to frustrate the insertion of tools or wires that might be able to pry the mat from the surface. Optional ribs 52 project downwardly from the plate. They are intended to bear against the top of the mat and press the mat against the surface more reliably. They are not adhesively bonded to the mat. The only adhesive bond is between the bottom of the mat and the surface on which the mat is laid.

The upper plate of the base plate is provided with four bores 55, 56, 57, 58 each of which is aligned with a respective post 45. Bolts 60 are passed through each of these bores and are threaded into respective posts 45. These bolts are the means to hold the base plate to the adhesive mat, and consequently to the surface.

When the bolts at bores 55 and 58 are tightened, they function only to hold the base plate to the mat. The bolts at bores 56 and 57 serve the additional function of assisting in the adjustment and holding of the rear brackets.

Each rear bracket (FIGS. 7–10) comprises a base bracket 70 and an upper bracket 71. The base bracket includes a flat slide portion 72 which bears against the base plate. A slot 73 extends along the slide portion to pass a bolt 60 which is threaded into a post 45. When this bolt is loose, the base bracket can be moved in and out and angularly, to adjust the bracket to fit to an article to be protected. A skirt 74 projects downwardly and makes a close approach to the surface when the bolt is fully tightened down in the adjusted position.

The base bracket also includes a vertically extending shroud portion 76 which is long enough to hold the upper bracket 71 in its adjusted position. The shroud portion and the upper bracket are partially cylindrical so the upper bracket can move vertically in the shroud portion with a close fit.

Threaded screw holes 77, 78 are formed in the shroud portion so that a bolt or screw 79 can be passed through them, through a respective slot 80 in the upper bracket, and tightened to a nut inside the bracket (not shown), this will hold the upper bracket in an adjusted position. The arcuate configuration of the upper bracket enables a nut to be contained therein without interferences with the protected article. The screws or nuts may be made with any arrangement to resist their being loosened, such as torque-off sections that are broken off leaving only countersunk or round surfaces exposed. Any other suitable lock means, even peening of the screw threads may also or instead be used. If an article of a different height is subsequently to be protected, these screws, which became permanently fixed, may have to be drilled out, but this is no problem when the mount is released, and the brackets can be handled conveniently. When installed they are a permanent barrier to raising the upper bracket.

The upper brackets include a rigid cap 81 which overhangs a corner of the article to prevent its being raised after the assembly is locked in place.

Thus, the two rear upper corners of the article are retained. There remains to be disclosed the arrangement to engage its top front edge.

Figure 15:
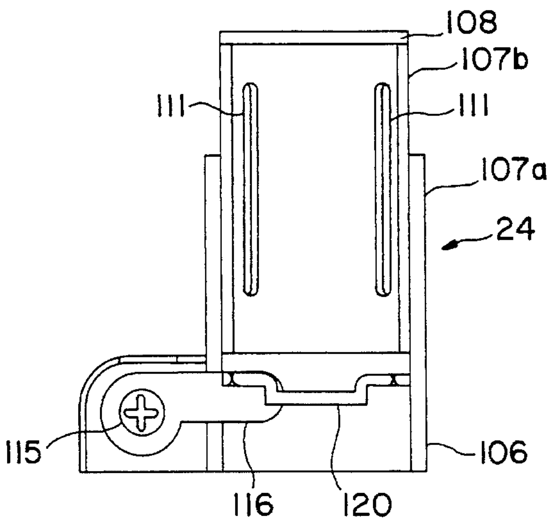
FIG. 15 is a right hand view of FIG. 11, with the addition of an additional bracket member.

For this purpose there is a front bracket and lock assembly 24 (FIG. 15) which includes a guide bracket 100 that has overlaying flanges 101, 102 and underlying flanges 103, 104. These form a guide channel 105. A skirt 106 extends downwardly to nearly contact the surface.

It also includes a base bracket 107 with a shroud portion 107*a*. An upper bracket 107*b* fits in shroud portion 107*a* for vertical sliding adjustment. A cap 108 overhangs the inside of bracket 107*b* so as to overhang the front edge of the article when installed. As in the rear brackets, screws (not shown) can be passed through holes 110 and through slots 111 to hold the upper bracket in an adjusted position. A complementary nut is used to engage the screw, and the screw-nut combination is provided with means to prevent unthreading. The arcuate shape shields the nut from instrusion.

A lock 115 is fixed to the guide bracket. It includes a movable flange 116 which in one position of the lock will restrain the guide bracket in its established position, and when released will permit its removal.

The front bracket further includes a slide member 120. This is plate-like, and is slidably fitted in the channel formed in the guide member. It has a longitudinal slot 121 through which two screws 122, 123 pass. These are threaded into the base plate. When appropriately positioned for the specific article, they are tightened down.

The slide member has a lock notch 125 in which lock flange 116 is engaged when locked. Accordingly, when installed, the position of the slide is fixed, and the guide member can be slid in and out along it. When in the inner position with its flange overhanging the front upper edge of the article, the guide member can be locked to the slide and the article is reliably retained, by turning the lock so the flange is in the notch. When unlocked, the guide bracket can be removed, and the article taken from the mount.

Figure 5:
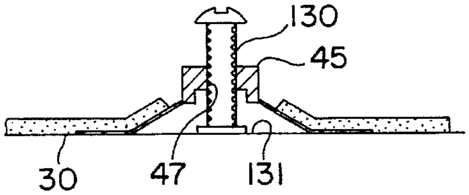
FIG. 5 shows the means to remove the mat from a surface.

Removal of the base plate from the surface is attained by peeling the mat from the surface. For this purpose, the screws holding the base plate to the mounts are removed, and the base plate is taken up. Then, as shown in FIG. 5, a new, longer screw 130 is threaded into it. When the mat was installed, a protector disc 131 was placed in the recess in the bottom of the post to protect the surface from this screw.

To release the mat, the base plate is lifted off, and the longer screws are threaded into and through the posts and tightened against plates 131. As the screw continues to be turned, the post is raised, pulling the metal sheet with it from its inner edge. This is a gradual process, which may take an hour or so. The metal plate flexes upwardly, and gradually peels the pad from the surface.

As soon as a free edge of the mat can be reached, the rest of the mat can readily be peeled from the surface.

To reuse the mount, it is only necessary to obtain a new mat and place it where the next article is to be located. If the same article is to be protected, nothing more need be done than to attach the base plate to the mat again and place the article in the mount. Otherwise it may be necessary to readjust the brackets.

This invention thereby provides substantial protection for articles having a wide range of shapes and sizes, and which can be installed and re-installed by the user without needing a technician, and at a very low cost.

This invention is not to be limited by the embodiment shown in the drawings and described in the description which is given by way of example and not of limitation but only in accordance with the scope of the appended claims.

We claim:

1. A security mount for releasably holding a separate protected article to a surface comprising:

a flexible mat having an adhesive face for attachment to said surface, said mat having a plurality of openings therethrough;

a plurality of flexible metal sheets, each surrounding a respective one of said openings, and having a post extending through said opening, said post having a threaded passage therethrough;

a base plate having a base portion to support said article, and an opening respective to each of said posts, said base plate overlaying said mat;

a plurality of headed bolts, one extending through each of said openings in said base plate and threaded into a respective said post, whereby to hold the base plate to the mat;

a first and a second rear bracket, spaced apart from one another to engage two rear corners of said article, said rear brackets being fastened to said base plate in such a manner as to be adjustable rotationally and horizontally, and having a vertically adjustable portion with an overhanging element, whereby to be adjustable and then fixed to hold said separate article at these brackets against being lifted or shifted rearwardly or sidewardly relative to the mount and whereby said vertically adjustable portion can be adjusted and fixed to said bracket by fastener means which fastener means, when set, resists removal while the article is engaged by the bracket;

a front bracket and lock assembly comprising a guide forming a channel and carrying lock means, and a slide fastened to said base plate, said slide having notch means complementary to said lock means to resist sliding movement of the guide when the lock means engages said notch, said front bracket further having a vertically adjustable portion with an overhanging element, whereby to be adjustable to hold the article against being lifted at its front upper edge, said slide being adjustably positionable on said base plate to establish the locked position of the front bracket.

2. A security mount according to claim 1 in which each of said rear brackets has a longitudinal slot therein, the said bolts holding the base plate to the respective post passing through said slots, whereby said rear brackets can be adjusted, and held in the adjusted position by tightening down the said bolts.

3. A security mount according to claim 1 in which said base plate has a hole therein, and in which said slide has a longitudinal slot therein, and a bolt passing through said slot and threaded into said hole in said base plate so as to permit horizontal sliding movement of the slide, and to hold it in an adjusted position when its respective bolt is tightened.

4. A security mount according to claim 1 in which said brackets and vertically adjustable portions are nested together, and are shaped as curved planes to shield said fastener means from intrusion.

5. A mount for releasably holding a separate article to a surface comprising:

a flexible mat having a first and a second face, said first face bearing adhesive means for attachment to said surface, and said second face bearing no adhesive means, said mat having an opening therethrough;

a flexible metal sheet contiguous to and adherent to said first face and surrounding said opening, and having a post extending through said opening and also having openings therethrough, through which said last-named openings said adhesive means, can contact said surface, said post having a threaded passage extending through said opening in said mat;

a headed bolt threaded into said post, whereby releasably to hold the article to said mat when said mat is adherent to said metal sheet and to said surface, whereby said bolt can further be turned to exert a force against said surface, gradually to release said mat from said surface by exertion of force between said metal plate and said surface.

* * * * *